US007920175B2

(12) United States Patent
Kawarada (10) Patent No.: US 7,920,175 B2
(45) Date of Patent: Apr. 5, 2011

(54) ELECTRONIC STILL CAMERA PERFORMING COMPOSITION OF IMAGES AND IMAGE CAPTURING METHOD THEREFOR

(75) Inventor: Masahiro Kawarada, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1451 days.

(21) Appl. No.: 11/331,914

(22) Filed: Jan. 13, 2006

(65) Prior Publication Data
US 2006/0152598 A1 Jul. 13, 2006

(30) Foreign Application Priority Data

Jan. 13, 2005 (JP) ................................ 2005-006665

(51) Int. Cl.
*H04N 9/73* (2006.01)
(52) U.S. Cl. ................ 348/226.1; 348/227.1; 348/228.1
(58) Field of Classification Search .... 348/226.1–228.1, 348/208.99, 208.4
See application file for complete search history.

(56) References Cited

U.S. PATENT DOCUMENTS

| 5,585,848 | A | 12/1996 | Hieda et al. | |
|---|---|---|---|---|
| 5,606,366 | A | 2/1997 | Hieda et al. | |
| 5,675,381 | A | 10/1997 | Hieda et al. | |
| 6,900,834 | B2* | 5/2005 | Henderson et al. | 348/226.1 |
| 7,187,405 | B2* | 3/2007 | Poplin et al. | 348/226.1 |
| 7,298,401 | B2* | 11/2007 | Baer | 348/226.1 |
| 7,312,823 | B1 | 12/2007 | Mori | |
| 7,358,989 | B2* | 4/2008 | Numazaki et al. | 348/227.1 |
| 7,471,315 | B2* | 12/2008 | Silsby et al. | 348/226.1 |
| 7,471,316 | B2* | 12/2008 | Takahashi et al. | 348/226.1 |
| 2004/0165091 | A1 | 8/2004 | Takemura et al. | |

FOREIGN PATENT DOCUMENTS

| JP | 01-241280 A | 2/1989 |
|---|---|---|
| JP | 64-34070 | 2/1989 |
| JP | 01-072667 A | 3/1989 |
| JP | 04-142883 A | 5/1992 |
| JP | 04-142888 A | 5/1992 |
| JP | 04-144379 A | 5/1992 |
| JP | 04-167776 A | 6/1992 |
| JP | 6-78223 | 3/1994 |
| JP | 06-253216 A | 9/1994 |
| JP | 08-098095 A | 4/1996 |
| JP | 08-294058 A | 11/1996 |
| JP | 9-261526 | 10/1997 |
| JP | 11-075109 A | 3/1999 |
| JP | 11-155106 A | 6/1999 |
| JP | 2000-175105 A | 6/2000 |
| JP | 2001-061105 A | 3/2001 |
| JP | 2003-250094 A | 9/2003 |
| JP | 2004-193922 A | 7/2004 |

* cited by examiner

*Primary Examiner* — Kelly L Jerabek
(74) *Attorney, Agent, or Firm* — Canon USA Inc. IP Division (57) ABSTRACT

An object of this invention is to suppress both the influence of a change in image quality by flicker and the influence of degradation of the image quality by a camera shake when an electronic still camera takes a picture under illumination having flicker. In an electronic still camera which captures a plurality of low-luminance images and composites them into one image of correct exposure, when the exposure time is shorter than the flicker interval of illumination light, the center of the exposure time is made to substantially coincide with the maximum value of the light quantity of illumination light. When the exposure time is longer than the flicker interval of illumination light, the exposure time is set again to a natural number multiple of the flicker interval.

12 Claims, 9 Drawing Sheets

PRIOR ART

ELECTRONIC STILL CAMERA PERFORMING COMPOSITION OF IMAGES AND IMAGE CAPTURING METHOD THEREFOR

FIELD OF THE INVENTION

The present invention relates to a technique of sequentially photographing and compositing a plurality of images in order to suppress a camera shake in an electronic still camera.

BACKGROUND OF THE INVENTION

Photographing with a still camera in a dark environment often causes a camera shake because of a long exposure time. In order to suppress a camera shake, an image capturing apparatus has conventionally been proposed which can obtain a focused image without decreasing the image quality.

For example, first, an image capturing apparatus disclosed in Japanese Patent Laid-Open No. 9-261526 sequentially captures low-luminance images in an exposure time during which no camera shake substantially occurs. Then, the image capturing apparatus corrects a positional error of each captured image, performs a composition process based on superposition, and finally generates one image of proper luminance. The image capturing apparatus can provide a focused image even if a camera shake occurs with a lens of a long focal length or in a long exposure time.

The image capturing apparatus disclosed in Japanese Patent Laid-Open No. 9-261526 will be briefly described.

First, the image capturing apparatus calculates, on the basis of a photographing focal length f in the optical system of the image capturing apparatus, the time of limit seconds t(f) serving as the upper limit of an accumulation time ta during which no camera shake occurs. Then, if ta ≧t(f) for the accumulation time ta obtained on the basis of the photometry result, the image capturing apparatus sets again the accumulation time ta to an arbitrary time which is equal to or shorter than the time of limit seconds t(f). The image capturing apparatus sets a sequential shooting count k in accordance with the reset value of the accumulation time ta, and executes sequential shooting by the sequential shooting count k. The image capturing apparatus corrects deviations between sequentially shot images, and composites them into one image of correct exposure. In this manner, the accumulation time can be controlled to suppress degradation of the image quality of a photographed image that is caused by a camera shake in photographing.

Another image capturing apparatus has conventionally been proposed which suppresses flicker generated when an image of an object is captured under illumination light which flickers at an interval different from the image capturing interval (an example of illumination light is a fluorescent lamp).

For example, when the flickering interval of illumination light which illuminates an object is different from the image capturing interval, an image capturing apparatus disclosed in Japanese Patent Laid-Open No. 6-78223 makes the timing when the illuminance of illumination light reaches a maximum value, coincide with the center of the charge accumulation period of a solid-state image capturing element. This suppresses flicker of an image caused by flickering illumination light.

The image capturing apparatus disclosed in Japanese Patent Laid-Open No. 6-78223 will be briefly described.

Figure 9:
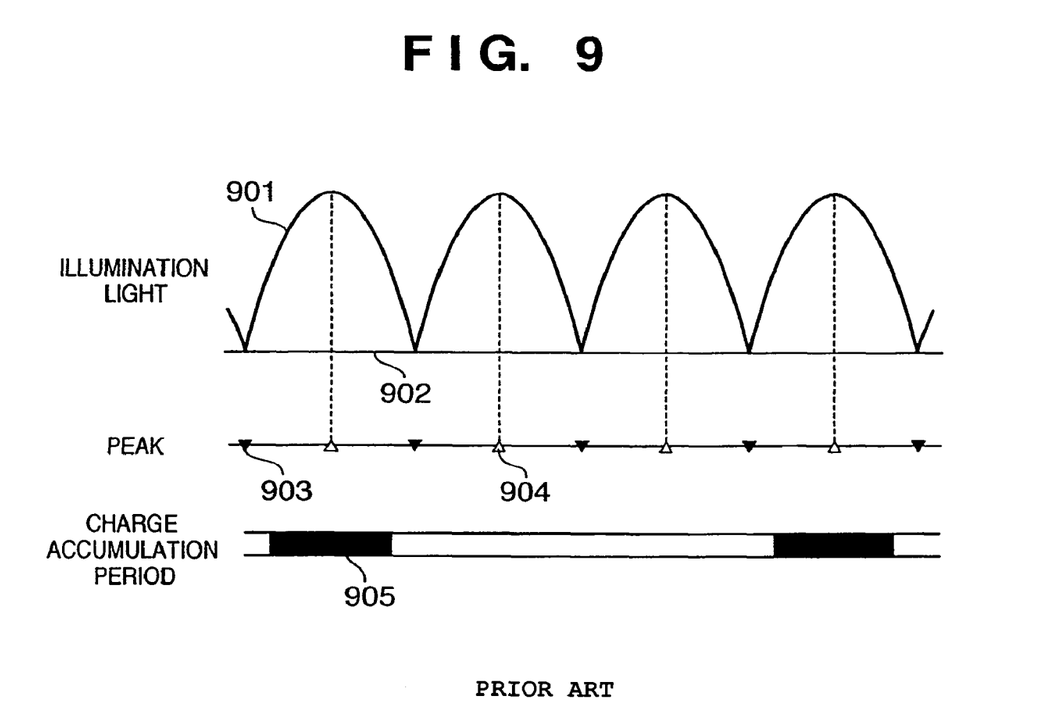
FIG. 9 is a graph for explaining a conventional electronic shutter control method.

FIG. 9 is a graph showing an electronic shutter control method in the image capturing apparatus disclosed in Japanese Patent Laid-Open No. 6-78223. In FIG. 9, reference numeral 901 denotes an illuminance level representing a change in the brightness of illumination light; and 902, a ground level. Reference numeral 903 denotes a phase of the minimum value of the illumination light quantity; and 904, a phase of the maximum value. Reference numeral 905 denotes a charge accumulation period of a solid-state image capturing element. The image capturing apparatus disclosed in Japanese Patent Laid-Open No. 6-78223 sequentially captures images. As operation of the image capturing apparatus, first, the image capturing apparatus detects the phases 904 of maximum values of the illumination light quantity in preceding fields, and stores a phase at which operation of an electronic shutter starts in the past three fields. Then, the image capturing apparatus predicts and controls the operation start time of the electronic shutter so that the center of the charge accumulation period of the solid-state image capturing element coincides with the phase 904 of the maximum value of the illumination light quantity. The electronic shutter is controlled to suppress flicker of an image.

Further, for example, an image capturing apparatus disclosed in Japanese Patent Laid-Open No. 1-34070 detects the flickering frequency of illumination light, adjusts the exposure time of an image capturing element to the flickering interval of illumination light, and thereby suppresses flicker of an image that is caused by an electronic shutter.

The image capturing apparatus disclosed in Japanese Patent Laid-Open No. 1-34070 will be briefly described.

When the image capturing method is NTSC at a field frequency of 60 Hz and the frequency of external light is 50 Hz (i.e., the flickering frequency of the light quantity is 100 Hz), the exposure time is set to ¹⁄₁₀₀ [sec]. When the image capturing method is PAL and the frequency of external light is 60 Hz (i.e., the flickering frequency of the light quantity is 120 Hz), the exposure time is set to ¹⁄₁₂₀ [sec]. The exposure time is controlled to suppress flicker of an image.

The image capturing apparatus disclosed in Japanese Patent Laid-Open No. 9-261526 may pose a problem if a plurality of images used for the composition process are discretely captured. For example, when the exposure time is shorter than the flickering interval under illumination light containing flicker, the minimum value of the illuminance of illumination light may fall within the exposure time but no maximum value may fall within it. For this reason, the luminance of an image generated by the composition process may become insufficient. To the contrary, when the exposure time is longer than the flickering interval under illumination light containing flicker, the number of minimum values of the illuminance of illumination light during the exposure time may become larger than that of maximum values. As a result, the luminance of an image generated by the composition process may become insufficient. Owing to these problems, when a picture is taken under a light source containing flicker by using the image capturing apparatus disclosed in Japanese Patent Laid-Open No. 9-261526, no image of correct exposure can be finally obtained depending on the setting of the photographing timing or the setting of the exposure time.

In the image capturing apparatus disclosed in Japanese Patent Laid-Open No. 6-78223, the luminance of an obtained image may decrease when the exposure time is longer than the flicker interval under illumination light containing flicker. For example, under a photographing condition that an exposure time T has a relation with a flicker interval f:

$$(2n-1)f < T < 2nf \quad (1)$$

(n is a natural number) if the timing when the illuminance of illumination light reaches a maximum value is made to coincide with the center of the exposure period, the number of minimum values of the illuminance of illumination light during the exposure time may become larger than that of maximum values. Hence, the luminance of an obtained image may become lower than that of an image photographed at the average illuminance of illumination light containing flicker. In addition, under a photographing condition that the exposure time T has a relation with the flicker interval f:

$$2nf < T < (2n+1)f \qquad (2)$$

(n is a natural number)
if the timing when the illuminance of illumination light reaches a maximum value is made to coincide with the center of the exposure period, the number of minimum values of the illuminance of illumination light during the exposure time may become smaller than that of maximum values. The luminance of an obtained image may become higher than that of an image photographed at the average illuminance of illumination light containing flicker.

The image capturing apparatus disclosed in Japanese Patent Laid-Open No. 1-34070 may pose a problem depending on the photographing condition when the exposure time is adjusted to the flicker interval under illumination light containing flicker. For example, if the flicker interval is longer than an exposure time during which no camera shake is predicted to occur, a camera shake may occur because an actual exposure time is set in accordance with the flicker interval.

SUMMARY OF THE INVENTION

The present invention has been made to overcome the conventional drawbacks, and has as its object to obtain an image of correct exposure even when a picture is taken under illumination light containing flicker by an electronic still camera which sequentially photographs a plurality of images and composites them into one image in order to suppress a camera shake.

To solve the above problems and achieve the above object, according to the first aspect of the present invention, an electronic still camera which, when a first exposure time during which correct exposure is obtained for a luminance of an object is not less than a predetermined exposure time, photographs a plurality of images in a second exposure time shorter than the first exposure time, and composites the plurality of images into one image of correct exposure is characterized by comprising a flicker detection device which detects a state of flicker of illumination light for illuminating the object, and an image capturing timing adjustment device which adjusts a timing when an image of the object is captured, wherein when the second exposure time is shorter than a flickering interval of flicker of illumination light that is detected by the flicker detection device, the image capturing timing adjustment device adjusts the timing when an image of the object is captured, so as to make a center of the second exposure time substantially coincide with a timing when a light quantity of illumination light represents a maximum value.

According to the second aspect of the present invention, an electronic still camera which, when a first exposure time during which correct exposure is obtained for a luminance of an object is not less than a predetermined exposure time, photographs a plurality of images in a second exposure time shorter than the first exposure time, and composites the plurality of images into one image of correct exposure is characterized by comprising a flicker detection device which detects a state of flicker of illumination light for illuminating the object, and an exposure time adjustment device which adjusts an exposure time during which an image of the object is captured, wherein when the second exposure time is longer than a flickering interval of flicker of illumination light that is detected by the flicker detection device, the exposure time adjustment device adjusts again the second exposure time to a natural number multiple of the flickering interval of the flicker.

According to the third aspect of the present invention, an electronic still camera which, when a first exposure time during which correct exposure is obtained for a luminance of an object is not less than a predetermined exposure time, photographs a plurality of images in a second exposure time shorter than the first exposure time, and composites the plurality of images into one image of correct exposure is characterized by comprising a flicker detection device which detects a state of flicker of illumination light for illuminating the object, an image capturing timing adjustment device which adjusts a timing when an image of the object is captured, so as to make a center of the second exposure time substantially coincide with a timing when a light quantity of illumination light represents a maximum value, an exposure time adjustment device which adjusts the second exposure time so as to adjust the second exposure time to a natural number multiple of a flickering interval of the flicker, and selection means for determining which of an interval of the flicker detected by the flicker detection device and the second exposure time is longer or shorter, and exclusively selecting the image capturing timing adjustment device and the exposure time adjustment device in accordance with a result of the determination.

According to the fourth aspect of the present invention, an image capturing method of, when a first exposure time during which correct exposure is obtained for a luminance of an object is not less than a predetermined exposure time, photographing a plurality of images in a second exposure time shorter than the first exposure time, and compositing the plurality of images into one image of correct exposure is characterized by comprising a flicker detection step of detecting a state of flicker of illumination light for illuminating the object, and an image capturing timing adjustment step of adjusting a timing when an image of the object is captured, wherein in the image capturing timing adjustment step, when the second exposure time is shorter than a flickering interval of flicker of illumination light that is detected in the flicker detection step, the timing when an image of the object is captured is so adjusted as to make a center of the second exposure time substantially coincide with a timing when a light quantity of illumination light represents a maximum value.

According to the fifth aspect of the present invention, an image capturing method of, when a first exposure time during which correct exposure is obtained for a luminance of an object is not less than a predetermined exposure time, photographing a plurality of images in a second exposure time shorter than the first exposure time, and compositing the plurality of images into one image of correct exposure is characterized by comprising a flicker detection step of detecting a state of flicker of illumination light for illuminating the object, and an exposure time adjustment step of adjusting an exposure time during which an image of the object is captured, wherein in the exposure time adjustment step, when the second exposure time is longer than a flickering interval of flicker of illumination light that is detected in the flicker detection step, the second exposure time is adjusted again to a natural number multiple of the flickering interval of the flicker.

According to the sixth aspect of the present invention, an image capturing method of, when a first exposure time during which correct exposure is obtained for a luminance of an object is not less than a predetermined exposure time, photographing a plurality of images in a second exposure time shorter than the first exposure time, and compositing the plurality of images into one image of correct exposure is characterized by comprising a flicker detection step of detecting a state of flicker of illumination light for illuminating the object, an image capturing timing adjustment step of adjusting a timing when an image of the object is captured, so as to make a center of the second exposure time substantially coincide with a timing when a light quantity of illumination light represents a maximum value, an exposure time adjustment step of adjusting the second exposure time so as to adjust the second exposure time to a natural number multiple of a flickering interval of the flicker, and a selection step of determining which of an interval of the flicker detected in the flicker detection step and the second exposure time is longer or shorter, and exclusively selecting the image capturing timing adjustment step and the exposure time adjustment step in accordance with a result of the determination.

According to the seventh aspect of the present invention, a program is characterized by causing a computer to execute the image capturing method.

According to the eighth aspect of the present invention, a storage medium is characterized by computer-readably storing the program.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the accompanying drawings.

First Embodiment

The whole configuration of an electronic still camera according to the first embodiment of the present invention will be explained.

Figure 1:
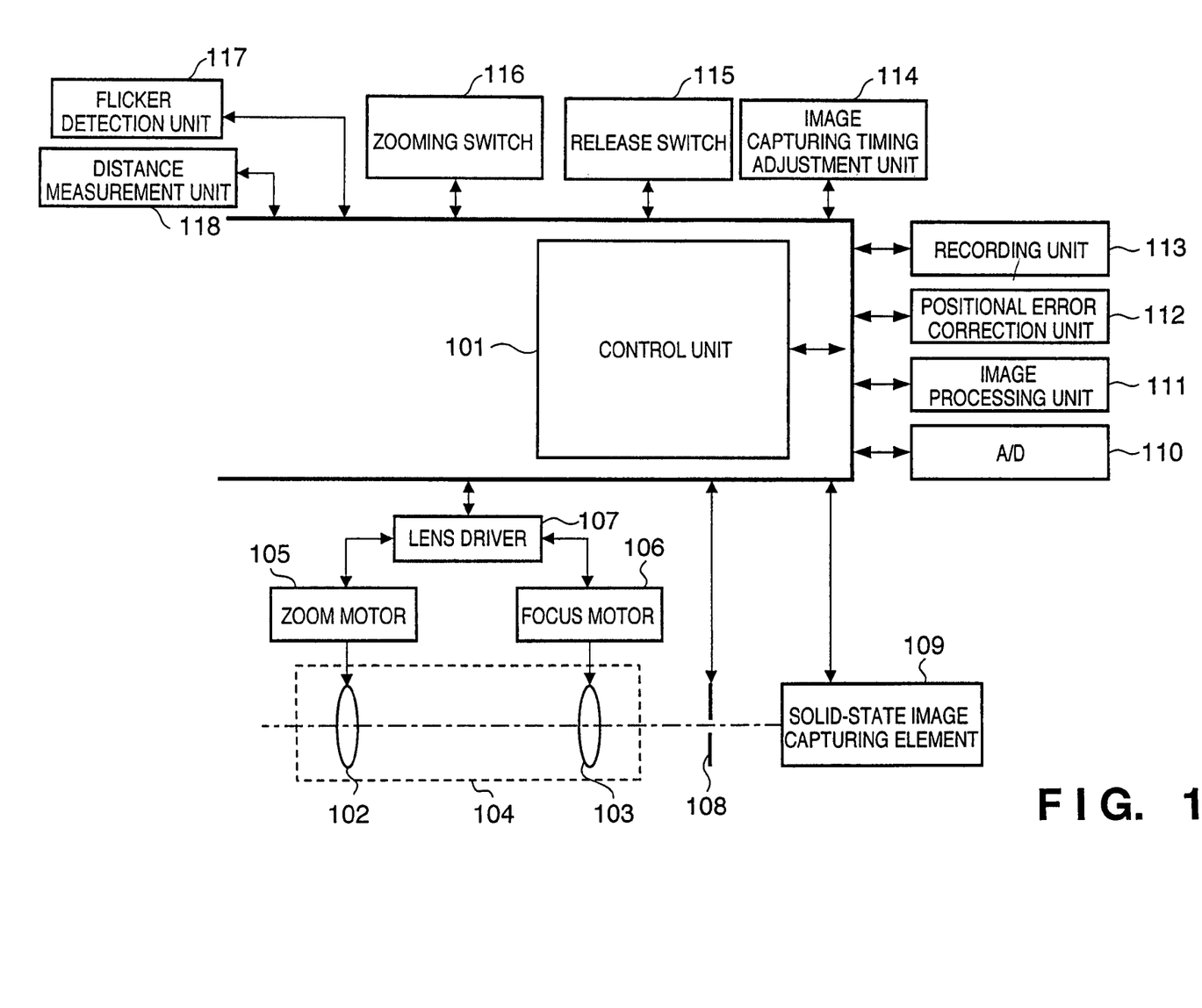
FIG. 1 is a block diagram showing the whole configuration of an electronic still camera according to the first embodiment of the present invention.

FIG. 1 is a block diagram showing the whole configuration of the electronic still camera according to the first embodiment.

In FIG. 1, reference numeral 101 denotes a control unit which comprises a CPU, a volatile memory, a nonvolatile memory holding a control program, a timer, and the like, and performs control of the overall apparatus and management of the current time. Reference numeral 102 denotes a zoom lens which adjusts the focal length; and 103, a focus lens which adjusts the focus (the zoom lens 102 and focus lens 103 form a lens unit 104). Reference numeral 105 denotes a zoom motor which is formed from a stepping motor and controls the position of the zoom lens 102; and 106, a focus motor which is also formed from a stepping motor and controls the position of the focus lens 103. Reference numeral 107 denotes a lens driver which is formed from a microcomputer, grasps the current focal length of the zoom lens 102, and notifies the zoom motor 105 and focus motor 106 of a target lens and its target position. Reference numeral 108 denotes a stop which is made up of a plurality of blades and adjusts the incident angle of a beam. Reference numeral 109 denotes a solid-state image capturing element which is made up of a plurality of photoelectric conversion elements and photoelectrically converts an incident object image; and 110, an A/D converter which digitizes an image signal of an object image output from the solid-state image capturing element. Reference numeral 111 denotes an image processing unit which comprises a DSP and volatile memory, and adjusts the luminance, color tone, and gain of an A/D-converted image signal. Reference numeral 112 denotes a positional error correction unit which also comprises a DSP and volatile memory, temporarily stores a plurality of image signals, and corrects positional errors between images. Reference numeral 113 denotes a recording unit which is made up of an external nonvolatile memory (e.g., compact flash®) and a recording control microcomputer; and 114, an image capturing timing adjustment unit which is made up of a timing generator and microcomputer. Reference numeral 115 denotes a two-stroke type release switch (the first switch is SW1, and the second switch is SW2). Reference numeral 116 denotes a zooming switch which has a structure in which two press buttons can be exclusively pressed, and inputs the driving instruction and driving direction of the zoom lens 102. Reference numeral 117 denotes a flicker detection unit which is mainly made up of a photoelectric conversion element and microcomputer, and detects the illuminance and flickering interval of illumination light; and 118, a distance measurement unit which is made up of a multi-lens optical system and a pair of line sensors, and measures the distance to an object by a phase difference method.

Figure 2:
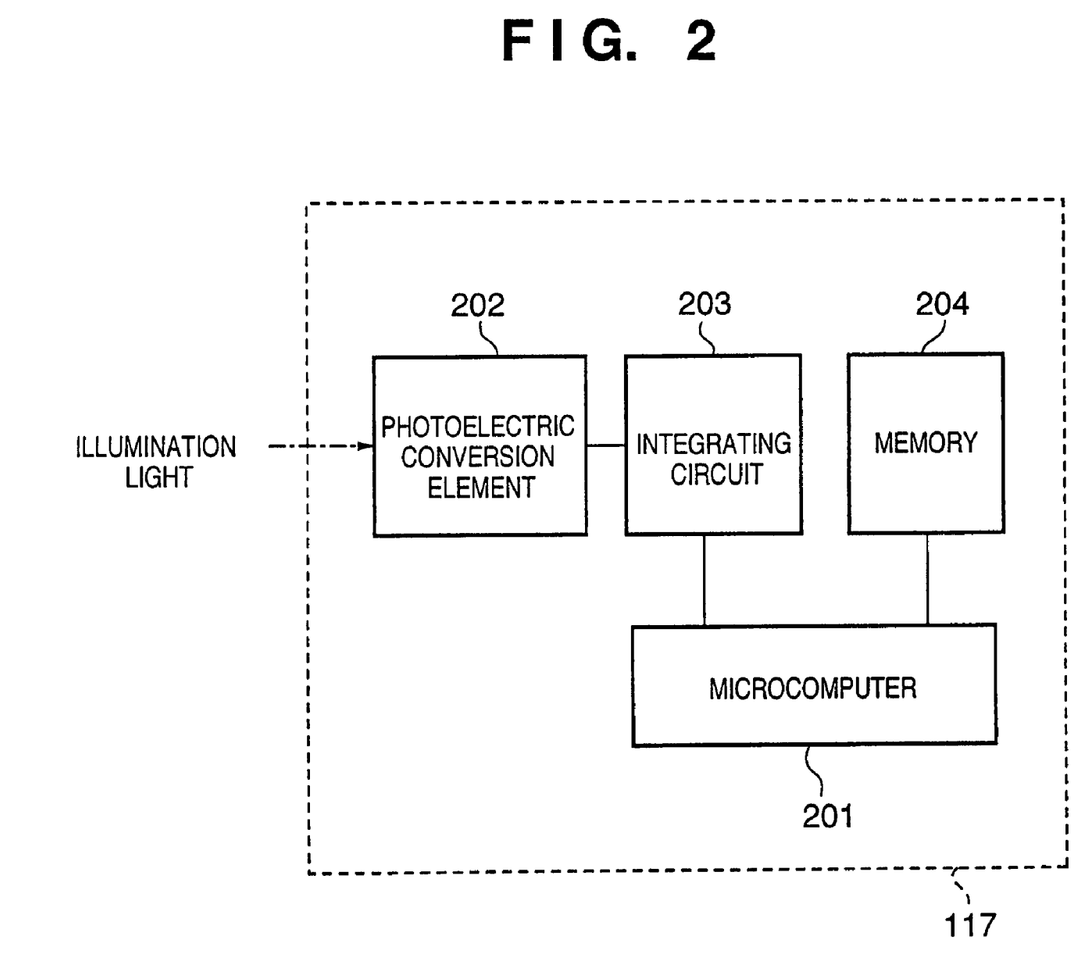
FIG. 2 is a block diagram showing the configuration of a flicker detection unit.

FIG. 2 is a block diagram showing the configuration of the flicker detection unit 117. Details of the flicker detection unit 117 will be explained with reference to FIG. 2.

The flicker detection unit 117 detects the illuminance of illumination light every sampling interval 1 [msec], and detects the illuminance and flickering interval of illumination light from the detection result. In FIG. 2, reference numeral 201 denotes a microcomputer which controls the whole flicker detection unit 117; 202, a photoelectric conversion element which converts the intensity of illumination light into an electrical signal; and 203, an integrating circuit which integrates electrical signals output from the photoelectric conversion element 202 for a predetermined time. Reference numeral 204 denotes a memory which is formed from a volatile memory and stores a plurality of interval values of the light quantity that are output from the integrating circuit 203.

When the electronic still camera is powered on, the flicker detection unit 117 communicates with the control unit 101 in advance, and synchronizes the time to detect the current time. First, in the flicker detection unit 117, the photoelectric conversion element 202 converts the illuminance of illumination light into charges, and outputs the obtained charges to the integrating circuit 203. The integrating circuit 203 integrates charges output from the photoelectric conversion element 202, and if an integration stop instruction is received from the microcomputer 201, outputs the interval value to the microcomputer 201. The microcomputer 201 transmits an integration stop instruction to the integrating circuit 203 every sampling interval 1 [msec], and receives the integral value of charges integrated for 1 [msec] from the integrating circuit 203. After the reception, the microcomputer 201 outputs the received integral value together with reception time data to the memory 204, which stores them. The microcomputer 201 collects integral values every sampling interval [msec], and calculates the timings of the maximum and minimum values of the illuminance of illumination light and the flickering interval from the illuminance of illumination light at sampling interval 10 [msec] that is formed from a set of 10 integral values and time data. As the calculation method, first, the microcomputer 201 compares temporally preceding and succeeding integral values from the set of 10 integral values and time data, and detects the maximum and minimum values of the integral values. Then, the microcomputer 201 calculates the time of one interval of flickering (=flickering interval) of illumination light from time data of the detected maximum and minimum values. Further, the microcomputer 201 calculates the average illuminance and maximum illuminance of one flickering interval used for photometry. After the calculation, the microcomputer 201 transmits the flickering interval data, and data on the average illuminance and maximum illuminance of the illuminance to the control unit 101. Subsequently, the microcomputer 201 predictively calculates the maximum and minimum values of the illuminance of illumination light every 10 [msec] from the flickering interval of illumination light and the time data of the maximum and minimum values. The microcomputer 201 periodically outputs the maximum value prediction time data of the predicted illuminance of illumination light, the flickering interval data, and the data on the average illuminance and maximum illuminance of the illuminance to the control unit 101. The flicker detection unit 117 executes this operation repetitively every 10 [msec].

Flicker is detected in a frequency range in which flicker is assumed to influence a photographed image. For example, a fluorescent lamp which is similar in interval to a practical exposure time may be assumed to detect flicker in a frequency range of 100 to 120 Hz. The frequency range in which flicker can be detected and the timing detection precision of the maximum value of flicker are determined by the charge accumulation time (=sampling interval) of the photoelectric conversion element 202 and the integral count (=sampling count) of the integrating circuit 203. For example, when the charge accumulation time is set to 1 [msec] and the integral count is set to 10 or more in order to detect 100-Hz flickering, the maximum value of the light quantity in 100-Hz flickering can be detected with an error of 2 [msec] or less.

Details of the image capturing timing adjustment unit 114 will be explained.

The image capturing timing adjustment unit 114 comprises a timing generator, microcomputer, volatile memory, and nonvolatile memory. The timing generator is formed from a quartz oscillator, and outputs a clock pulse. The nonvolatile memory stores in advance the delay time till the start of actually capturing an image by the solid-state image capturing element 109 after transmission of an image capturing instruction. When the electronic still camera is powered on, the image capturing timing adjustment unit 114 communicates with the control unit 101 in advance, and synchronizes the time to detect the current time. First, the image capturing timing adjustment unit 114 receives, from the control unit 101, maximum value prediction time data of illumination light that is obtained by the flicker detection unit 117. Further, the image capturing timing adjustment unit 114 receives, from the control unit 101, bit information representing that SW2 has been pressed. Upon reception of the bit information, on the basis of a clock pulse regularly output from the timing generator, the maximum value prediction time, and the delay time, the microcomputer in the image capturing timing adjustment unit 114 calculates an image capturing instruction transmission timing when the center of the exposure time substantially coincides with the maximum value of the illuminance of illumination light. The microcomputer transmits an image capturing instruction to the control unit 101 on the basis of the calculated timing.

The operation of the electronic still camera according to the first embodiment will be described.

Figure 3:
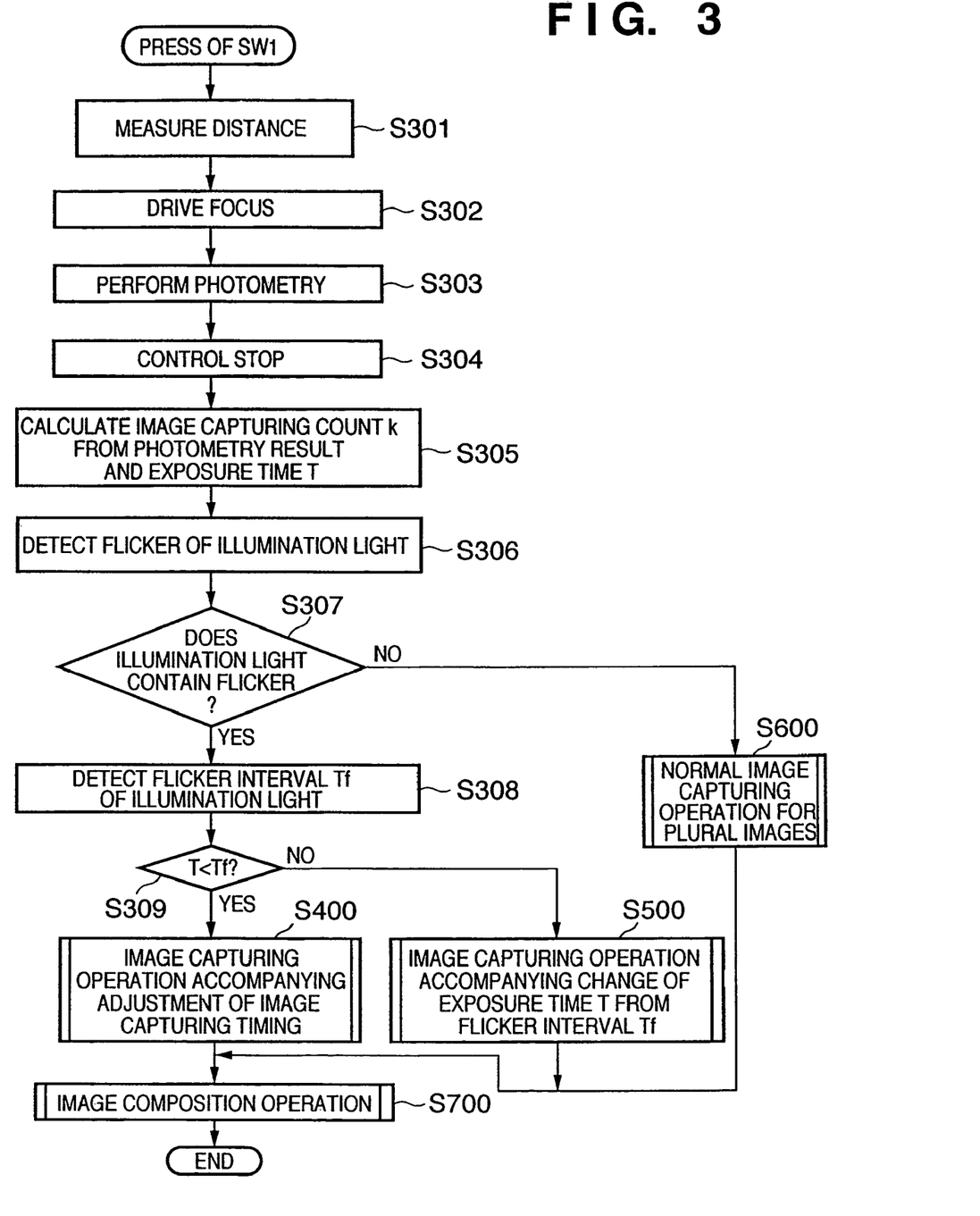
FIG. 3 is a flowchart for explaining the operation of the electronic still camera according to the first embodiment.

FIG. 3 is a flowchart for explaining the operation of the electronic still camera according to the first embodiment. The operation of the electronic still camera will be explained with reference to FIG. 3. In the electronic still camera according to the first embodiment, an exposure time Tc during which a camera shake is predicted to occur, and a predetermined short exposure time T (more specifically, a time of 1/focal length (sec) or less in conversion into a 35-mm film camera) which considers prevention of a camera shake are set in advance.

In the electronic still camera, if SW1 of the release switch 115 is pressed, the distance measurement unit 118 measures the distance (step S301), and transmits the distance measurement result to the control unit 101. After transmission, the control unit 101 calculates the in-focus position of the focus lens 103 on the basis of the distance measurement result, and moves the focus lens 103 to the in-focus position via the lens driver 107 (step S302). After the movement, the control unit 101 performs photometry on the basis of the average illuminance of the illuminance of illumination light that is transmitted from the flicker detection unit 117, and attains an exposure time necessary to obtain an image of correct exposure (step S303). The control unit 101 controls the stop 108 on the basis of the photometry result and exposure time T (step S304). After the stop control, if the photometry result is shorter than the exposure time Tc during which a camera shake is predicted to occur, photographing is executed for a necessary exposure time by a method as disclosed in Japanese Patent Laid-Open No. 9-261526, without performing sequential image capturing operation for a plurality of images in the first embodiment. If the photometry result is longer than the exposure time Tc during which a camera shake is predicted to occur, the control unit 101 calculates, from the preset exposure time T, an image capturing count k of low-luminance images necessary to obtain one image of correct exposure by composition (step S305). The image capturing count k is calculated by dividing, by the exposure time T of a low-luminance image, an exposure time necessary to obtain one image of correct exposure. After this, the flicker detection unit 117 starts detecting flicker of illumination light (step S306). The process is switched depending on whether illumination light contains flicker (step S307).

If flicker in a predetermined frequency range is detected from illumination light, the process advances to step S308 in order to perform image capture operation for suppressing flicker; if no flicker is detected, to step S600 in order to perform normal sequential image capturing operation for a plurality of images. Step S308 is a step of executing characteristic operation of the first embodiment. In step S308, the flicker detection unit 117 detects the flicker interval of illumination light. After detection, the flicker detection unit 117 compares the exposure time T and flicker interval Tf (step S309). If T<Tf, the process advances to step S400 (to be described later) in order to adjust the image capturing timing and sequentially capture images; if T≧Tf, to step S500 (to be described later) in order to change the exposure time T on the basis of the flicker interval and sequentially capture images. After sequential image capturing operation in step S400, S500, or S600, the positional error correction unit 112 corrects deviations between captured images, and obtains one image of proper luminance by composition. The image of proper luminance is saved in the recording unit 113 (step S800).

Figure 4:
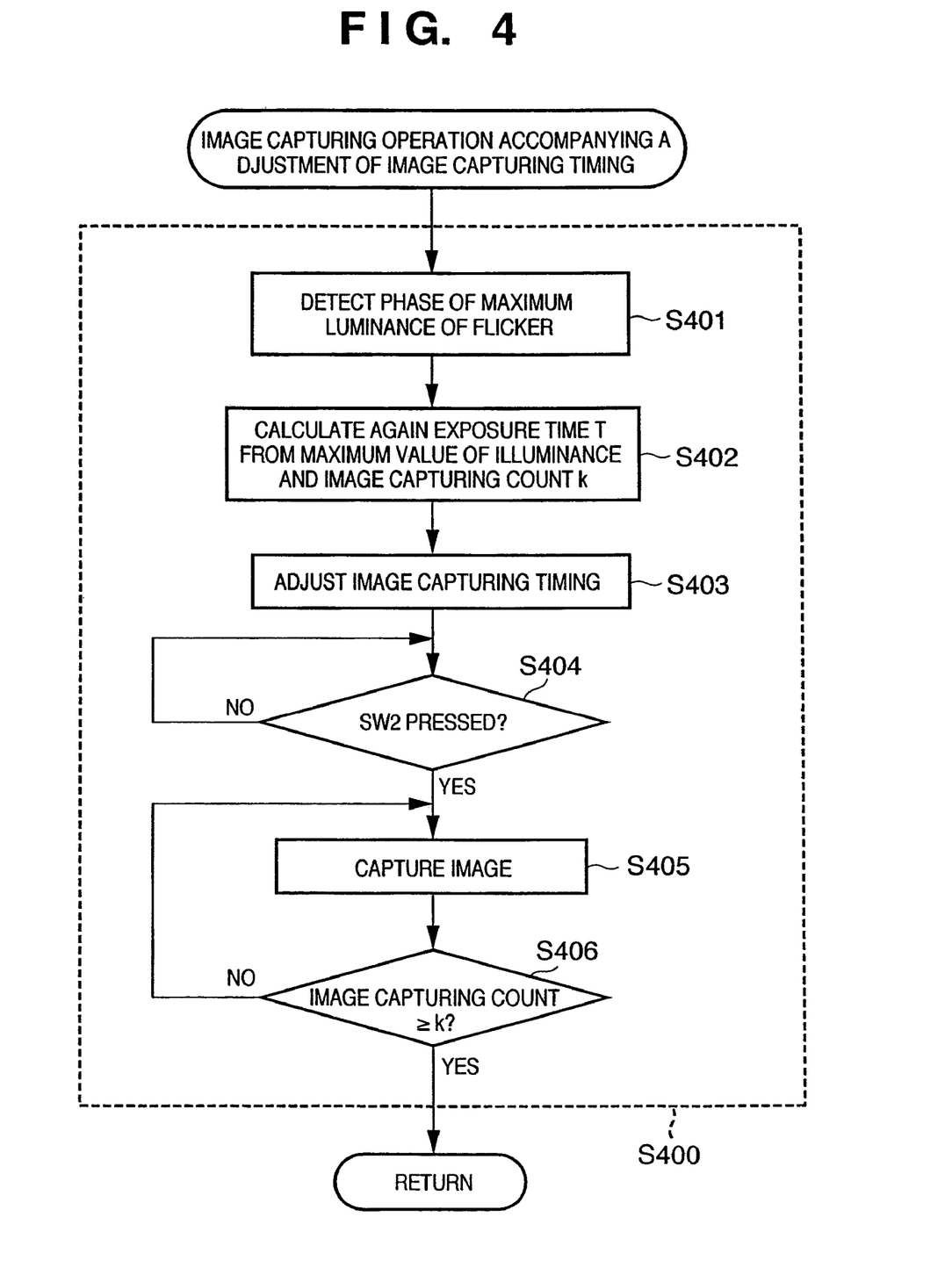
FIG. 4 is a flowchart for explaining the sequential image capturing operation of adjusting the image capturing timing and capturing images.

The operation of adjusting the image capturing timing and sequentially capturing images in step S400 will be explained.

FIG. 4 is a flowchart for explaining the operation of adjusting the image capturing timing and sequentially capturing images. This operation will be described with reference to FIG. 4.

If flicker of an interval longer than the exposure time is detected in illumination light, the flicker detection unit 117 detects the phase of the maximum value of the illumination light quantity (to be simply referred to as a maximum illuminance phase), and transmits information on the maximum illuminance phase to the image capturing timing adjustment unit 114 (step S401). After the transmission, the control unit 101 calculates again, from the illuminance at the maximum value of flickering of illumination light and the photographing count k, the exposure time T necessary to finally obtain one image of correct exposure (step S402). After the recalculation, the image capturing timing adjustment unit 114 calculates an image capturing instruction transmission timing so that the timing when the illumination light quantity reaches a maximum value falls within the exposure period, on the basis of the exposure time T, the maximum illuminance phase, and the pre-recorded delay time till the start of actually capturing an image by the solid-state image capturing element 109 after transmission of an image capturing instruction (step S403). Then, the process waits until SW2 is pressed (step S404). If SW2 is pressed, the control unit 101 transmits, to the image capturing timing adjustment unit 114, bit information representing that SW2 has been pressed. Upon reception of the bit information, the image capturing timing adjustment unit 114 transmits an image capturing instruction to the control unit 101 at the exposure start time when the maximum value of the illumination light quantity is made to substantially coincide with the center of the exposure period. Upon reception of the image capturing instruction, the control unit 101 executes image capturing operation on the basis of the exposure time T (step S405). Image capturing operation is done by procedures of photoelectrically converting an object image by the solid-state image capturing element 109, AD-converting the image signal by the A/D converter 110, and correcting the luminance and color tone by the image processing unit 111. After the correction, the image data is transmitted to the positional error correction unit 112. The above-described image capturing operation is executed repetitively by the image capturing count k calculated in step S305 of FIG. 3 (step S406).

Figure 5:
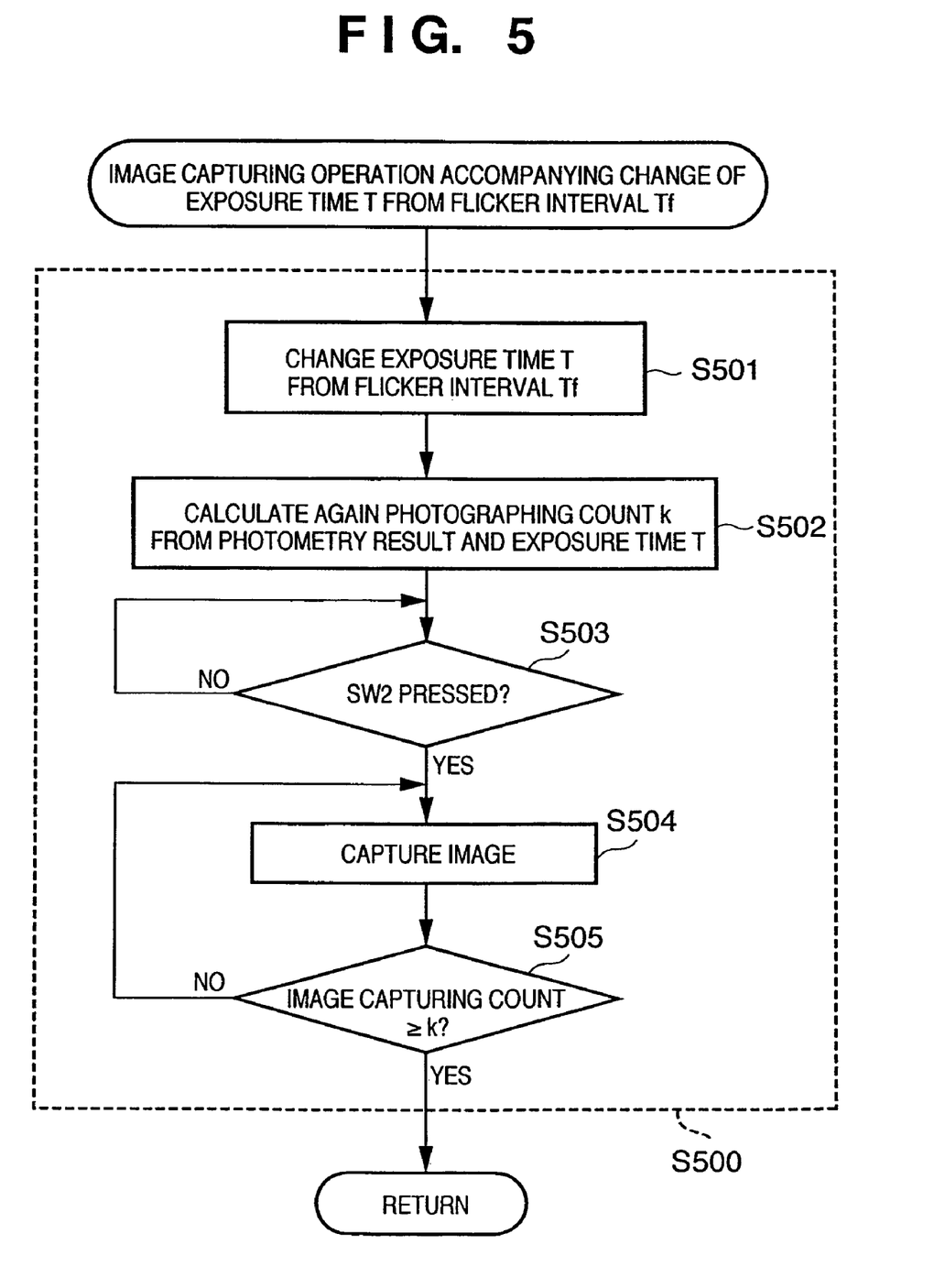
FIG. 5 is a flowchart for explaining the sequential image capturing operation of changing the exposure time on the basis of the flicker interval, and capturing images.

The operation of changing the exposure time T on the basis of the flicker interval and sequentially capturing images in step S500 will be explained.

FIG. 5 is a flowchart for explaining the operation of calculating again the exposure time T on the basis of the flicker interval and sequentially capturing images. This operation will be described with reference to FIG. 5.

If flicker of an interval equal to or shorter than the exposure time is detected in illumination light, the control unit 101 sets again the exposure time T to T=Tf×n (n is a natural number) for the flicker interval Tf (step S501). After resetting, the control unit 101 calculates again, from the photometry result and the exposure time T, the image capturing count k necessary to finally obtain one image of correct exposure (step S502). Then, the process waits until SW2 is pressed (step S503). If SW2 is pressed, the control unit 101 performs image capturing operation on the basis of the exposure time T (step S504). Image capturing operation is done by procedures of photoelectrically converting an object image by the solid-state image capturing element 109, AD-converting the image signal by the A/D converter 110, and correcting the luminance and color tone by the image processing unit 111. After this, the image data is transmitted to the positional error correction unit 112. Image capturing operation is repeated by the image capturing count k calculated again in step S502 (step S505).

Figure 6:
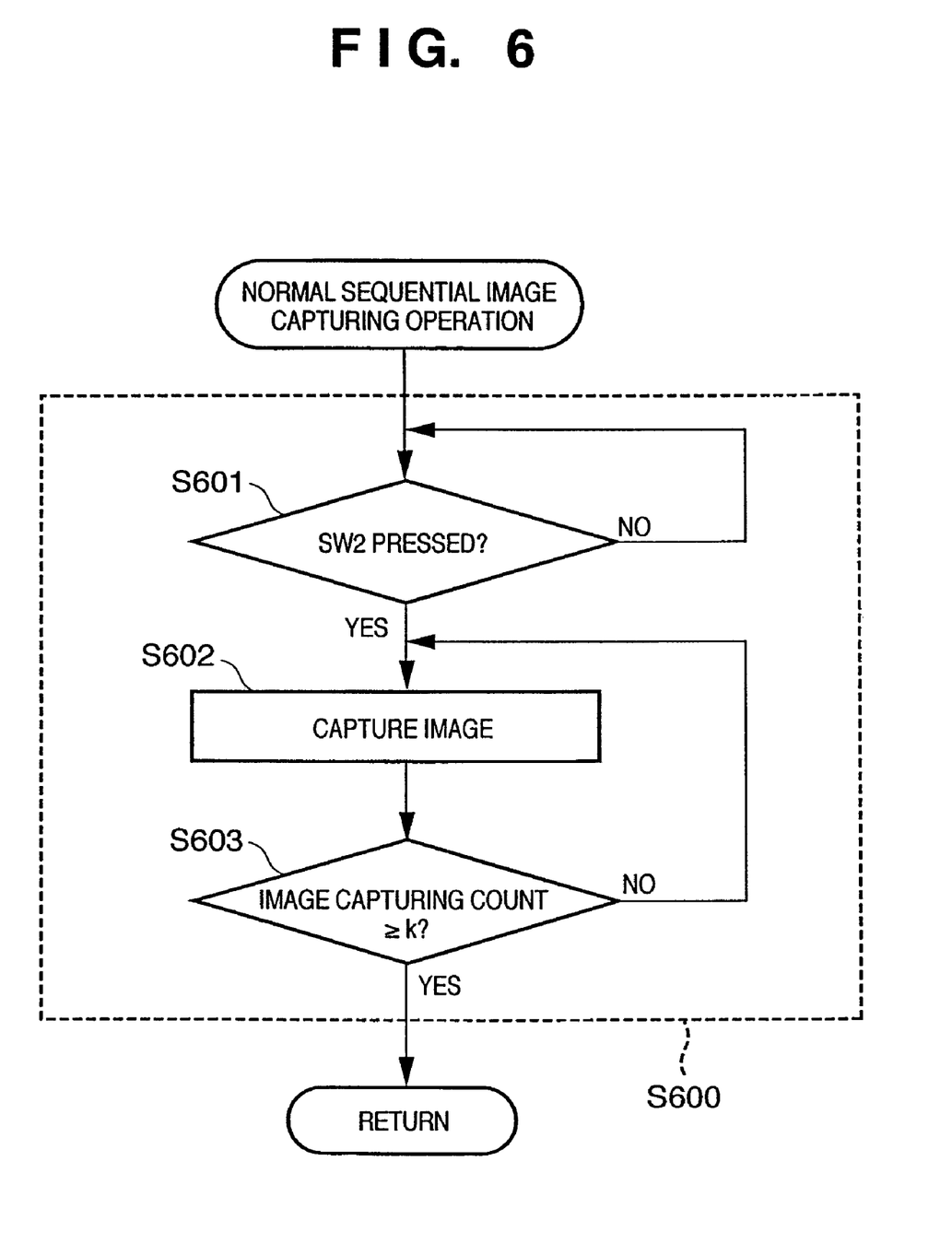
FIG. 6 is a flowchart for explaining the normal sequential image capturing operation for a plurality of images.

Normal sequential image capturing operation for a plurality of images in step S600 will be explained.

FIG. 6 is a flowchart for explaining normal sequential image capturing operation for a plurality of images. This operation will be described with reference to FIG. 6.

If no flicker is detected in illumination light, the process waits until SW2 is pressed (step S601). If SW2 is pressed, the control unit 101 performs image capturing operation on the basis of the exposure time T (step S602). Image capturing operation is done by procedures of photoelectrically converting an object image by the solid-state image capturing element 109, AD-converting the image signal by the A/D converter 110, and correcting the luminance and color tone by the image processing unit 111. Next, the image data is transmitted to the positional error correction unit 112. Image capturing operation is repeated by the image capturing count k calculated in step S305 in FIG. 3 (step S603).

Figure 7:
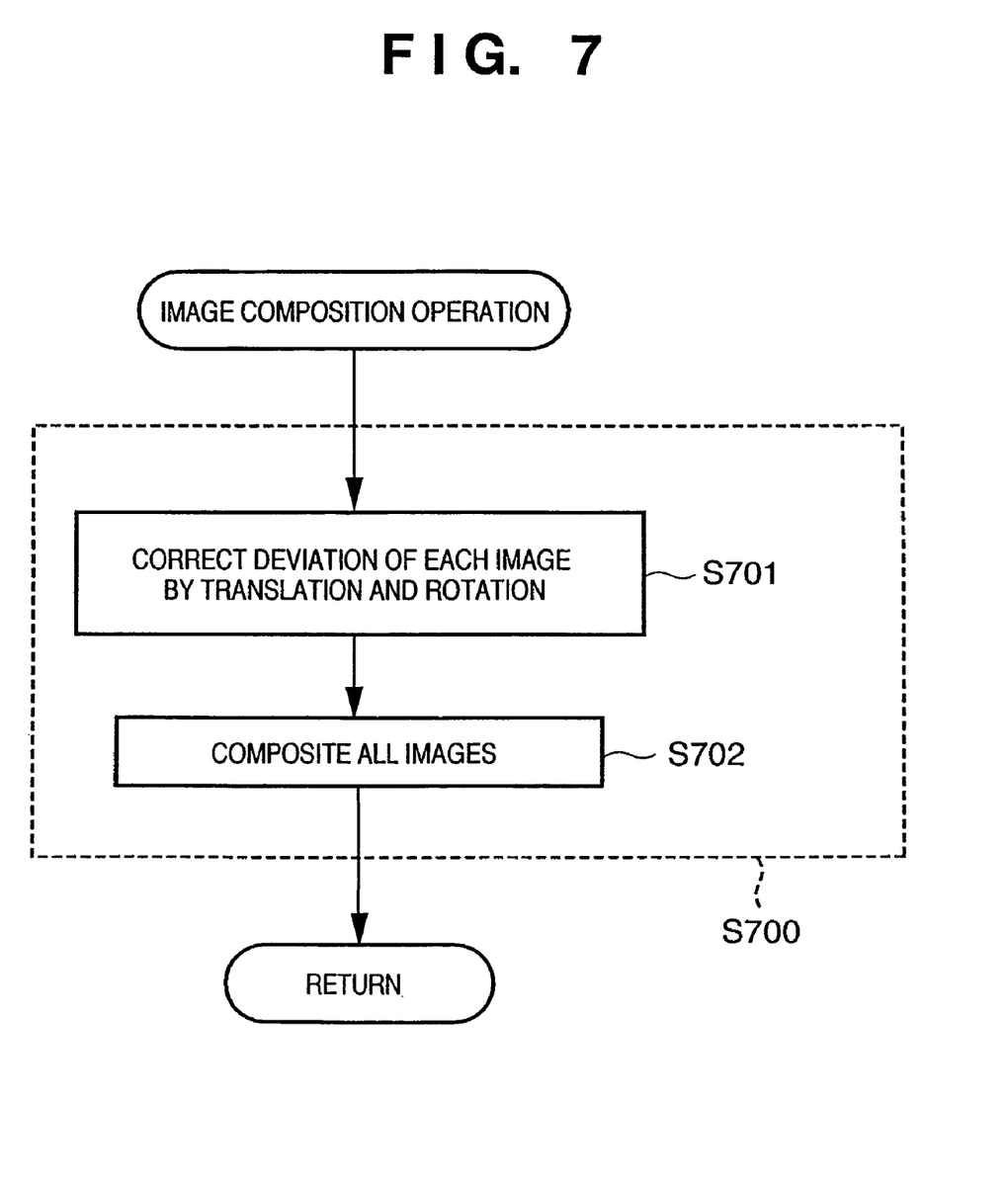
FIG. 7 is a flowchart for explaining the operation of compositing a plurality of images.

The operation of compositing a plurality of captured images into one image of correct exposure in step S700 will be explained.

FIG. 7 is a flowchart for explaining the operation of compositing a plurality of captured images into one image of correct exposure. This operation will be described with reference to FIG. 7.

Upon the completion of image capturing operation for a plurality of images, image data by the image capturing count k are stored in the positional error correction unit 112. The positional error correction unit 112 detects positional errors between obtained image data, and corrects the positional error by translating or rotating the image data in accordance with the detection result (step S701). In correction operation, as described in Japanese Patent Laid-Open No. 9-261526, deviations between images are detected at a plurality of portions of the images, and the directions and distances of relative deviations from the first image are extracted. Subsequently, the positional error correction unit 112 calculates an average image center on the basis of information on the directions and distances of the deviations that are extracted by the image capturing count k. The positional error correction unit 112 then corrects the deviations between images on the basis of the information on the directions and distances of the deviations and the image center information, and temporarily stores each corrected image. The positional error correction unit 112 composites the image data obtained by correcting the deviations between images, thereby generating one image of correct exposure (step S702). The generated image data of correct exposure is recorded in the recording unit 113 in step S800 of FIG. 3.

By the above operation, when the exposure time is shorter than the flicker interval, the maximum value of the illuminance of illumination light falls within the exposure period, and the minimum value is excluded. In contrast, when the exposure time is longer than the flicker interval, a larger number of minimum values of the illuminance of illumination light can be prevented from falling in the exposure time than the number of maximum values. With these settings, the electronic still camera can prevent a failure in obtaining an image of sufficient exposure even by compositing low-luminance images when a plurality of low-luminance images are sequentially composited into one image of correct exposure in order to prevent a camera shake.

Second Embodiment

In the first embodiment, the exposure time T is set before SW1 is pressed, and image capturing operation for suppressing flicker is automatically selected in accordance with the relationship between the exposure time T and the flickering interval of the illumination light quantity. In the second embodiment, the exposure time T is automatically set on the basis of the focal length of the lens when SW1 is pressed, and image capturing operation for suppressing flicker is automatically selected indirectly on the basis of the focal length of the lens.

An electronic still camera according to the second embodiment of the present invention will be described. The whole configuration of the electronic still camera according to the second embodiment is the same as that in the first embodiment. The operation of the electronic still camera according to the second embodiment will be explained.

Figure 8:
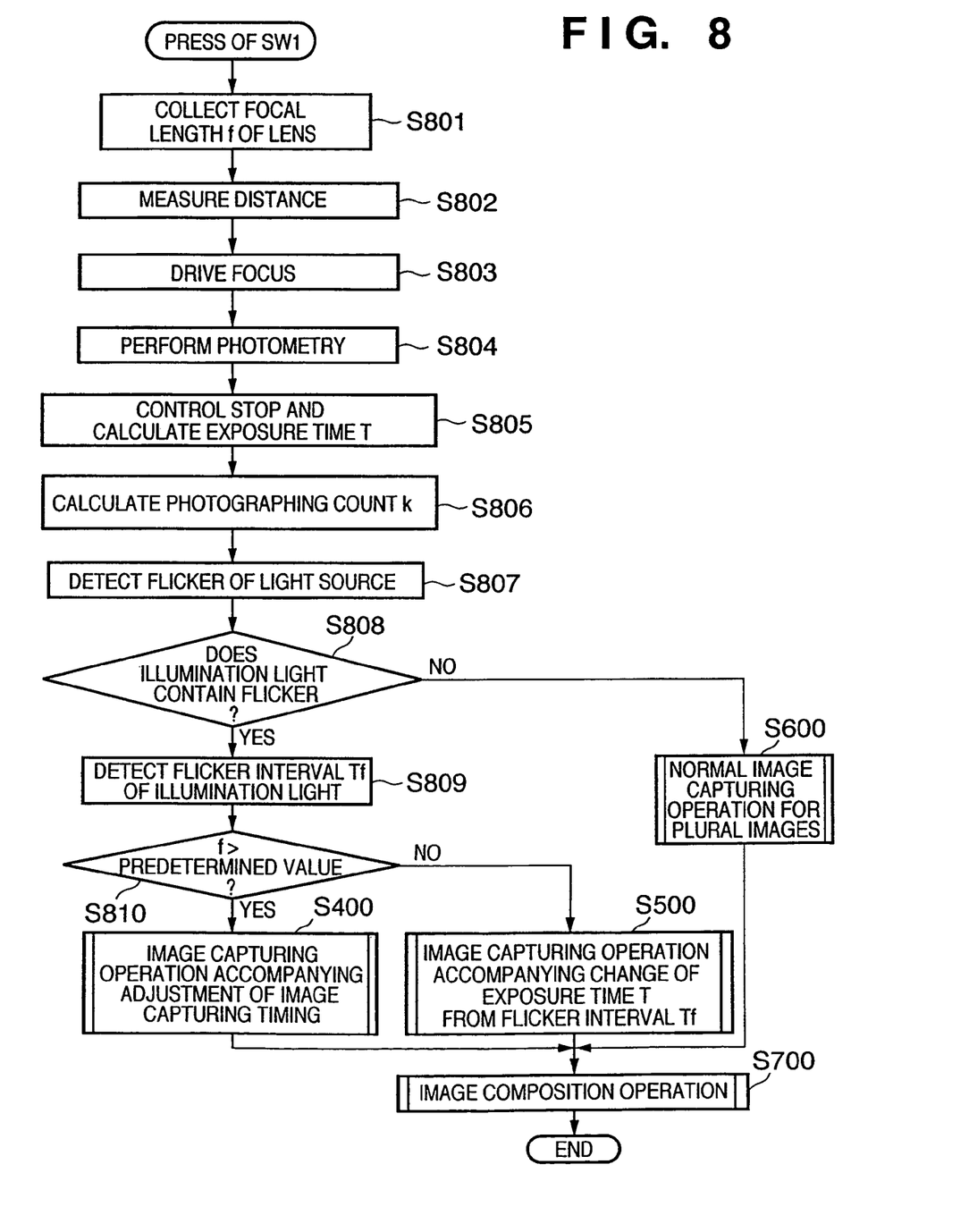
FIG. 8 is a flowchart for explaining the operation of an electronic still camera according to the second embodiment.

FIG. 8 is a flowchart for explaining the operation of the electronic still camera according to the second embodiment. The operation of the electronic still camera will be explained with reference to FIG. 8.

In the electronic still camera, if SW1 of a release switch 115 is pressed, a control unit 101 collects the photographing focal length of a zoom lens 102 via a lens driver 107 (step S801). After this, a distance measurement unit 118 measures the distance (step S802). The control unit 101 calculates the in-focus position of a focus lens 103 on the basis of the distance measurement result, and moves the focus lens 103 to the in-focus position via the lens driver 107 (step S803). Then, the control unit 101 performs photometry on the basis of flickering interval data of flicker and data on the average illuminance and maximum illuminance of the illuminance that are transmitted from the flicker detection unit 117 (step S804), and performs control of a stop 108 and calculation of the exposure time T on the basis of the photometry result (step S805). In order to suppress the influence of a camera shake in photographing, a lower limit condition based on the focal length information f is set for the exposure time T. For example, when a picture is taken by a solid-state image capturing apparatus having an image capturing area corresponding to the size of one frame of a 35-mm film, a value is selected on the condition that $T \leq 1/f$ (sec) for the focal length f (mm) of the zoom lens 102. This setting can substantially suppress the influence of a camera shake. However, a diagonal size SD of the solid-state image capturing element of a general electronic still camera is generally smaller than a diagonal size Sf of one frame of the 35-mm film. For this reason, the exposure time T has a condition: $T \leq (1/f) \times (SD/Sf)$ by reflecting the size of the image capturing area of the solid-state image capturing element 109. Since (SD/Sf)<1, the exposure time T must be set shorter than that of the 35-mm film camera. After this setting, the control unit 101 calculates, from the photometry result in step S804 and the exposure time T calculated in step S805, the image capturing count k of low-luminance images necessary to obtain one image of correct exposure by composition (step S806). The image capturing count k is calculated by dividing, by the exposure time T of a low-luminance image, an exposure time necessary to obtain one image of correct exposure. A flicker detection unit 117 then starts detecting flicker of illumination light (step S807). The process is switched depending on whether illumination light contains flicker (step S808).

If flicker in a predetermined frequency range is detected from illumination light, the process advances to step S809 in order to perform image capture operation for suppressing flicker; if no flicker is detected, to step S600 in order to perform normal sequential image capturing operation for a plurality of images, similar to the first embodiment. In step S809, the flicker detection unit 117 detects the flicker interval of illumination light. The flicker detection unit 117 compares the exposure time T and flicker interval Tf (step S810). If T<Tf, the process advances to step S400 in order to adjust the image capturing timing and sequentially capture images, similar to the first embodiment. If NO in step S810, the process advances to step S500 in order to change the exposure time T on the basis of the flicker interval and sequentially capture images, similar to the first embodiment. After sequential image capturing operation in step S400, S500, or S600, the positional error correction unit 112 corrects deviations between captured images, and composites the corrected images into one image of proper luminance. The image of proper luminance is saved in a recording unit 113 (step S900).

By the above operation, the exposure time T is automatically set short in accordance with the focal length of the lens in the electronic still camera which sequentially composites a plurality of low-luminance images into one image of correct exposure in order to prevent a camera shake. Hence, the effect of suppressing a camera shake can be automatically maintained even upon a change in the focal length of the lens. In addition, a failure in obtaining an image of sufficient exposure even by compositing low-luminance images can be prevented.

Third Embodiment

In the first and second embodiments, the control unit 101 is equipped with a timer for managing the current time. However, the present invention is not limited to this configuration, and the timer may be omitted as far as the present invention employs a configuration which synchronizes the timing between the control unit 101, the flicker detection unit 117, and the image capturing timing adjustment unit 114.

The zoom motor 105 and focus motor 106 are stepping motors, but are not limited to them, and may use DC motors, ultrasonic motors, or various power mechanisms.

The recording unit 113 is a compact flash®, but is not limited to this, and may use another external nonvolatile memory, hard disk, or the like.

The distance measurement unit 118 measures distance by the phase difference method, but is not limited to this, and may employ contrast AF (so-called hill-climbing AF).

Photometry is executed in step S303. This photometry can use any one of various photometry devices for photometry based on a temporary image capturing result by the solid-state image capturing element, photometry by an external sensor, and photometry which uses the photoelectric conversion element of the flicker detection unit.

The sampling interval of the flicker detection unit 117 is set to 1 [msec], but is not limited to this. The sampling interval can also be changed in accordance with the flickering frequency of target illumination light and a required detection precision. The sampling period of the flicker detection unit 117 is set to 10 [msec], but is not limited to this. The sampling period can also be changed in accordance with the flickering frequency of target illumination light and a required detection precision.

In step S402, the exposure time T is calculated again on the basis of the maximum value of the light quantity of illumination light and the photographing count k. However, the present invention is not limited to this, and the photographing count k may be calculated again on the basis of the maximum value of the light quantity of illumination light and the exposure time T which has already been set.

In the image capturing timing adjustment unit 114, the timing oscillator is a quartz oscillator, but is not limited to this and may be formed from another oscillator. In addition, various modifications can be made without departing from the spirit and scope of the invention.

As has been described above, according to the first to third embodiments, a larger number of minimum values of the illuminance of illumination light can be prevented from falling in the exposure time than the number of maximum values in the electronic still camera which sequentially captures a plurality of low-luminance images and composites them into one image of correct exposure in order to prevent a camera shake. Consequently, the electronic still camera can prevent a failure in obtaining an image of sufficient exposure even by compositing low-luminance images.

In addition to the above effects, the electronic still camera can automatically select a flicker suppression method of adjusting the image capturing timing in accordance with the relationship between the exposure time and the flickering interval of the illumination light quantity, and a flicker suppression method of changing the exposure time to a natural number multiple of the flicker interval and calculating again the image capturing count.

In addition to the above effects, the electronic still camera can automatically select indirectly on the basis of the focal length of the lens a flicker suppression method of adjusting the image capturing timing by automatically setting the exposure time to suppress a camera shake in accordance with the focal length of the lens in photographing, and a flicker suppression method of changing the exposure time to a natural number multiple of the flicker interval and calculating again the image capturing count.

The present invention can suppress both the influence of a change in image quality by flicker and the influence of degradation of the image quality by a camera shake when the electronic still camera takes a picture under illumination having flicker.

Other Embodiment

The object of the embodiments can also be achieved by supplying a storage medium (or recording medium) which stores software program codes for implementing the functions of the above-described embodiments to a system or apparatus and causing the computer (or CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the OS (Operating System) running on the computer performs some or all of actual processes on the basis of the instructions of the program codes.

The functions of the above-described embodiments are also implemented when the program codes read out from the storage medium are written in the memory of a function expansion card inserted into the computer or a function expansion unit connected to the computer, and the CPU of the function expansion card or function expansion unit performs some or all of actual processes on the basis of the instructions of the program codes.

When the present invention is applied to the storage medium, the storage medium stores program codes corresponding to the above-described procedures.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-006665 filed on Jan. 13, 2005, which is hereby incorporated by reference herein its entirety.

What is claimed is:

1. An electronic still camera which, when a first exposure time during which correct exposure is obtained for a luminance of an object is not less than a predetermined exposure time, photographs a plurality of images in a second exposure time shorter than the first exposure time, and composites the plurality of images into one image of correct exposure, characterized by comprising:
   a flicker detection device which detects a state of flicker of illumination light for illuminating the object; and
   an image capturing timing adjustment device which adjusts a timing when an image of the object is captured,
   wherein when the second exposure time is shorter than a flickering interval of flicker of illumination light that is detected by said flicker detection device, said image capturing timing adjustment device adjusts the timing when an image of the object is captured, so as to make a center of the second exposure time substantially coincide with a timing when a light quantity of illumination light represents a maximum value.

2. An electronic still camera which, when a first exposure time during which correct exposure is obtained for a luminance of an object is not less than a predetermined exposure time, photographs a plurality of images in a second exposure time shorter than the first exposure time, and composites the plurality of images into one image of correct exposure, characterized by comprising:
   a flicker detection device which detects a state of flicker of illumination light for illuminating the object; and
   an exposure time adjustment device which adjusts an exposure time during which an image of the object is captured,
   wherein when the second exposure time is longer than a flickering interval of flicker of illumination light that is detected by said flicker detection device, said exposure time adjustment device adjusts again the second exposure time to a natural number multiple of the flickering interval of the flicker.

3. An electronic still camera which, when a first exposure time during which correct exposure is obtained for a luminance of an object is not less than a predetermined exposure time, photographs a plurality of images in a second exposure time shorter than the first exposure time, and composites the plurality of images into one image of correct exposure, characterized by comprising:

a flicker detection device which detects a state of flicker of illumination light for illuminating the object;

an image capturing timing adjustment device which adjusts a timing when an image of the object is captured, so as to make a center of the second exposure time substantially coincide with a timing when a light quantity of illumination light represents a maximum value;

an exposure time adjustment device which adjusts the second exposure time so as to adjust the second exposure time to a natural number multiple of a flickering interval of the flicker; and selection means for determining which of an interval of the flicker detected by said flicker detection device and the second exposure time is longer or shorter, and exclusively selecting said image capturing timing adjustment device and said exposure time adjustment device in accordance with a result of the determination.

4. The camera according to claim 3, characterized by further comprising a photographing count determination device which determines a photographing count of the plurality of images on the basis of the first exposure time and the second exposure time.

5. The camera according to claim 3, characterized by further comprising an exposure time setting device which sets the second exposure time on the basis of a focal length of a lens which is attached to the electronic still camera.

6. The camera according to claim 3, characterized by further comprising exposure time readjustment means for calculating a third exposure time shorter than the second exposure time on the basis of a photographing count of the plurality of images and the maximum value of the light quantity of the illumination light obtained by said flicker detection device, wherein when said selection means selects said image capturing timing adjustment device, an image is captured on the basis of the third exposure time.

7. An image capturing method of, when a first exposure time during which correct exposure is obtained for a luminance of an object is not less than a predetermined exposure time, photographing a plurality of images in a second exposure time shorter than the first exposure time, and compositing the plurality of images into one image of correct exposure, characterized by comprising:

a flicker detection step of detecting a state of flicker of illumination light for illuminating the object; and an image capturing timing adjustment step of adjusting a timing when an image of the object is captured, wherein in the image capturing timing adjustment step, when the second exposure time is shorter than a flickering interval of flicker of illumination light that is detected in the flicker detection step, the timing when an image of the object is captured is so adjusted as to make a center of the second exposure time substantially coincide with a timing when a light quantity of illumination light represents a maximum value.

8. An image capturing method of, when a first exposure time during which correct exposure is obtained for a luminance of an object is not less than a predetermined exposure time, photographing a plurality of images in a second exposure time shorter than the first exposure time, and compositing the plurality of images into one image of correct exposure, characterized by comprising:

a flicker detection step of detecting a state of flicker of illumination light for illuminating the object; and an exposure time adjustment step of adjusting an exposure time during which an image of the object is captured, wherein in the exposure time adjustment step, when the second exposure time is longer than a flickering interval of flicker of illumination light that is detected in the flicker detection step, the second exposure time is adjusted again to a natural number multiple of the flickering interval of the flicker.

9. An image capturing method of, when a first exposure time during which correct exposure is obtained for a luminance of an object is not less than a predetermined exposure time, photographing a plurality of images in a second exposure time shorter than the first exposure time, and compositing the plurality of images into one image of correct exposure, characterized by comprising:

a flicker detection step of detecting a state of flicker of illumination light for illuminating the object;

an image capturing timing adjustment step of adjusting a timing when an image of the object is captured, so as to make a center of the second exposure time substantially coincide with a timing when a light quantity of illumination light represents a maximum value;

an exposure time adjustment step of adjusting the second exposure time so as to adjust the second exposure time to a natural number multiple of a flickering interval of the flicker; and a selection step of determining which of an interval of the flicker detected in the flicker detection step and the second exposure time is longer or shorter, and exclusively selecting the image capturing timing adjustment step and the exposure time adjustment step in accordance with a result of the determination.

10. The method according to claim 9, characterized by further comprising a photographing count determination step of determining a photographing count of the plurality of images on the basis of the first exposure time and the second exposure time.

11. The method according to claim 9, characterized by further comprising an exposure time setting step of setting the second exposure time on the basis of a focal length of a lens which is attached to an electronic still camera.

12. The method according to claim 9, characterized by further comprising an exposure time readjustment step of calculating a third exposure time shorter than the second exposure time on the basis of a photographing count of the plurality of images and the maximum value of the light quantity of the illumination light obtained in the flicker detection step, wherein when the image capturing timing adjustment step is selected in the selection step, an image is captured on the basis of the third exposure time.

* * * * *